US012646986B2

(12) United States Patent
Fedida

(10) Patent No.: US 12,646,986 B2
(45) Date of Patent: Jun. 2, 2026

(54) ELECTRIC MOTOR WITH ASYMMETRICAL PERMANENT MAGNET LAYOUT AND INTER-POLAR BRIDGE INBETWEEN MAGNETS

(71) Applicant: GM Global Technology Operations LLC, Detroit, MI (US)

(72) Inventor: Vincent Fedida, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 212 days.

(21) Appl. No.: 18/637,938

(22) Filed: Apr. 17, 2024

(65) Prior Publication Data

US 2025/0323540 A1 Oct. 16, 2025

(30) Foreign Application Priority Data

Apr. 11, 2024 (CN) .......................... 202410436877.9

(51) Int. Cl.
*H02K 1/27* (2022.01)
*B60L 50/60* (2019.01)
(Continued)

(52) U.S. Cl.
CPC .............. *H02K 1/276* (2013.01); *B60L 50/60* (2019.02); *H02K 21/14* (2013.01)

(58) Field of Classification Search
CPC ........ H02K 1/24; H02K 1/2746; H02K 1/276; H02K 1/278; H02K 21/14; H02K 29/03; H02K 41/031

(Continued)

(56) References Cited

U.S. PATENT DOCUMENTS 7,705,504 B2 * 4/2010 Nakayama ........... H02K 1/2766
310/156.56
7,808,143 B2 * 10/2010 Lee ...................... H02K 1/2766
310/156.56
(Continued)

FOREIGN PATENT DOCUMENTS

CN        107317415 A  * 11/2017  ............... H02K 1/02
CN        108777518 A  * 11/2018  ............... H02K 1/27
(Continued)

OTHER PUBLICATIONS

CN-113131642-B English Translation.*
DE-102019002449-A1 English Translation.*

*Primary Examiner* — Maged M Almawri
(74) *Attorney, Agent, or Firm* — Vivacqua Crane, PLLC

(57) ABSTRACT

An electric motor includes a stator and a rotor. The rotor includes a rotor core and a plurality of permanent magnets each disposed in one of the plurality of rotor cavities. The rotor core includes a plurality of polar pieces arranged annularly about the rotational axis. The plurality of permanent magnets includes a first permanent magnet and a second permanent magnet. The first permanent magnet is disposed inside the first rotor cavity. The second permanent magnet is disposed in the second rotor cavity. The rotor core includes an intra-polar bridge in each of the plurality of polar pieces. The first permanent magnet has a first surface area. The second permanent magnet has a second surface area. The second surface area is greater than the first surface area.

20 Claims, 3 Drawing Sheets

(51) Int. Cl.
  *H02K 1/276*          (2022.01)
  *H02K 21/14*          (2006.01)

(58) Field of Classification Search
  USPC ............ 310/154.29, 154.06, 154.21, 154.22,
                310/154.24, 154.36, 154.35,
                310/156.38–156.52, 156.58, 156.65,
                310/156.66, 156.07, 156.08, 156.68
  See application file for complete search history.

(56) References Cited

U.S. PATENT DOCUMENTS

|  |  |  |  |  |
|---|---|---|---|---|
| 9,520,752 | B1 * | 12/2016 | Laldin | H02K 1/246 |
| 11,128,197 | B2 * | 9/2021 | Todeschini Hilgert | H02K 1/18 |
| 11,289,985 | B2 * | 3/2022 | Tangudu | H02K 1/30 |
| 11,456,637 | B2 * | 9/2022 | Sakauchi | H02K 1/146 |
| 2007/0284960 | A1 * | 12/2007 | Fulton | H02K 1/278 |
|  |  |  |  | 310/156.01 |
| 2010/0213781 | A1 * | 8/2010 | Rahman | H02K 1/2766 |
|  |  |  |  | 310/156.56 |
| 2010/0327787 | A1 * | 12/2010 | Sakai | H02P 21/22 |
|  |  |  |  | 318/400.09 |
| 2013/0069470 | A1 * | 3/2013 | Jurkovic | H02K 1/276 |
|  |  |  |  | 310/156.53 |
| 2013/0147302 | A1 * | 6/2013 | Rahman | H02K 1/2766 |
|  |  |  |  | 310/156.32 |
| 2015/0054372 | A1 * | 2/2015 | Chung | H02K 41/031 |
|  |  |  |  | 310/216.096 |
| 2015/0145371 | A1 * | 5/2015 | Kim | H02K 1/276 |
|  |  |  |  | 310/156.53 |
| 2015/0357870 | A1 * | 12/2015 | Hazeyama | H02K 1/2766 |
|  |  |  |  | 310/156.07 |
| 2017/0317540 | A1 * | 11/2017 | Laldin | H02K 1/2766 |
| 2025/0030285 | A1 * | 1/2025 | Sabaini | H02K 1/2766 |

FOREIGN PATENT DOCUMENTS

| CN | 110994840 | A | * | 4/2020 | ........... H02K 1/2786 |
|---|---|---|---|---|---|
| CN | 113131642 | A | * | 7/2021 | ........... H02K 1/2766 |
| CN | 113489200 | A |  | 10/2021 |  |
| CN | 114157063 | A | * | 3/2022 | ........... H02K 1/2753 |
| CN | 114678984 | A | * | 6/2022 | ............... H02K 1/02 |
| CN | 115378160 | A | * | 11/2022 | ............ H02P 21/22 |
| CN | 113131642 | B | * | 1/2023 | ........... H02K 1/2766 |
| CN | 218633491 | U | * | 3/2023 |  |
| CN | 117013727 | A | * | 11/2023 | ........... H02K 1/276 |
| CN | 118157347 | A | * | 6/2024 | ........... H02K 1/276 |
| CN | 118264008 | A | * | 6/2024 | ........... H02K 21/028 |
| CN | 118739657 | A | * | 10/2024 | ............... H02K 1/02 |
| CN | 118826335 | A |  | 10/2024 |  |
| CN | 119362740 | A | * | 1/2025 | ............. H02K 21/02 |
| CN | 120049654 | A | * | 5/2025 | ............... H02K 1/02 |
| CN | 118040943 | B | * | 10/2025 | ............... H02K 1/16 |
| DE | 102019002449 | A1 | * | 7/2020 | ........... H02K 1/276 |
| EP | 2506399 | A2 | * | 10/2012 | ........... H02K 1/2766 |
| WO | WO-0122560 | A1 | * | 3/2001 | ........... H02K 1/2773 |
| WO | WO-2013158059 | A1 | * | 10/2013 | ........... H02K 1/2766 |
| WO | WO-2016179841 | A1 | * | 11/2016 | ............... H02K 1/27 |
| WO | WO-2020170885 | A1 | * | 8/2020 | ............... H02K 3/04 |
| WO | 2022121276 | A1 |  | 6/2022 |  |

* cited by examiner

ELECTRIC MOTOR WITH ASYMMETRICAL PERMANENT MAGNET LAYOUT AND INTER-POLAR BRIDGE INBETWEEN MAGNETS

INTRODUCTION

The present disclosure relates to electric motors with asymmetrical permanent magnet layout.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles include electric motors for propulsion. To enhance vehicle propulsion, it is desirable to maximize the torque produced by an electric motor while minimizing energy consumption.

SUMMARY

The present disclosure describes an electric motor for maximizing torque while minimizing energy consumption. The electric motor includes a stator having a plurality of electrical conductors. The electric motor further includes a rotor concentrically disposed in relation to the stator. The rotor is rotatable relative to the stator about a rotational axis. The rotor is spaced apart from the stator to define an air gap between the stator and the rotor. The rotor includes a rotor core defining an outermost rotor surface and an innermost rotor surface opposite the innermost rotor surface. The rotor core includes a plurality of polar pieces arranged annularly about the rotational axis. Each polar piece represents a magnetic pole of the electric motor. At least one of the plurality of polar pieces defines a plurality of rotor cavities. The plurality of rotor cavities includes a first rotor cavity and a second rotor cavity spaced apart from each other.

The rotor includes a plurality of permanent magnets each disposed in one of the plurality of rotor cavities. The plurality of permanent magnets includes a first permanent magnet and a second permanent magnet in each of the polar pieces. In the depicted embodiment, there are only two magnetic layers each having a V-shape. However, it is envisioned that the rotor may include more magnetic layers (e.g., three or four magnetic layers). Each magnetic layer may have two permanent magnets. The first permanent magnet is disposed inside the first rotor cavity. The second permanent magnet is disposed in the second rotor cavity. The rotor core includes an intra-polar bridge in each of the plurality of polar pieces. The intra-polar bridge separates the first rotor cavity from the second rotor cavity. Therefore, the electric motor may have five permanent magnets. The first permanent magnet is the first surface area. The second permanent magnet has a second surface area. The second surface area is greater than the first surface area.

In an aspect of the present disclosure, the first permanent magnet has a first length and a first width. The second permanent magnet has a second length and a second width. The first width is equal to the second width. The second length is greater than the second length. The intra-polar bridge has a bridge width that extends from the first rotor cavity to the second rotor cavity. The first length of the first permanent magnet is greater than the bridge width, and the second length of the second permanent magnet is greater than the bridge width. The intra-polar bridge has a bridge length. The first permanent magnet has a first linear wall and a second linear wall opposite the first linear wall. The first width extends from the first linear wall to the second linear wall. The first linear wall is closer to the outermost rotor surface than the second linear wall. The second linear wall is closer to the innermost rotor surface than the first linear wall. The second permanent magnet has a first linear boundary and a second linear boundary opposite the first linear boundary. The second width extends from the first linear boundary to the second linear boundary. The first linear boundary is closer to the outermost rotor surface than the second linear boundary. The second linear boundary is closer to the innermost rotor surface than the first linear boundary. The bridge length extends the first linear wall of the first permanent magnet to the second linear boundary of the second permanent magnet along a bridge direction. The second width of the second permanent magnet is less than the bridge length. The first linear boundary is spaced apart from the second linear boundary along the bridge direction, the second width of the second permanent magnet is defined from the first linear boundary to the second linear boundary along the bridge direction. The bridge length is less than the first width of the first permanent magnet. The first permanent magnet has a third linear wall and a fourth linear wall, the first length of the first permanent magnet extends from the third linear wall to the fourth linear wall. The first permanent magnet defines a first axis extending through the third linear wall and the fourth linear wall. The first axis intersects the third linear wall at a perpendicular angle. The first axis intersects the fourth linear wall at a perpendicular angle. The second permanent magnet has a third linear boundary and a fourth linear boundary. The second length extends from the third linear boundary to the fourth linear boundary. The second permanent magnet defines a second axis extending from the third linear boundary to the fourth linear boundary. The second axis intersects the third linear boundary at a perpendicular angle. The second axis intersects the fourth linear boundary at a perpendicular angle. An angle is defined from the first axis to the second axis. The angle is oblique. The angle may be greater than ten degrees and less than ninety degrees.

The present disclosure also describes a propulsion system for a vehicle. The propulsion system includes a battery and an electric motor as described above. The electric motor is electrically connected to the battery.

The present disclosure also describes a vehicle. The vehicle includes a vehicle body and an electric motor as described above. The electric motor is coupled to the vehicle body.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
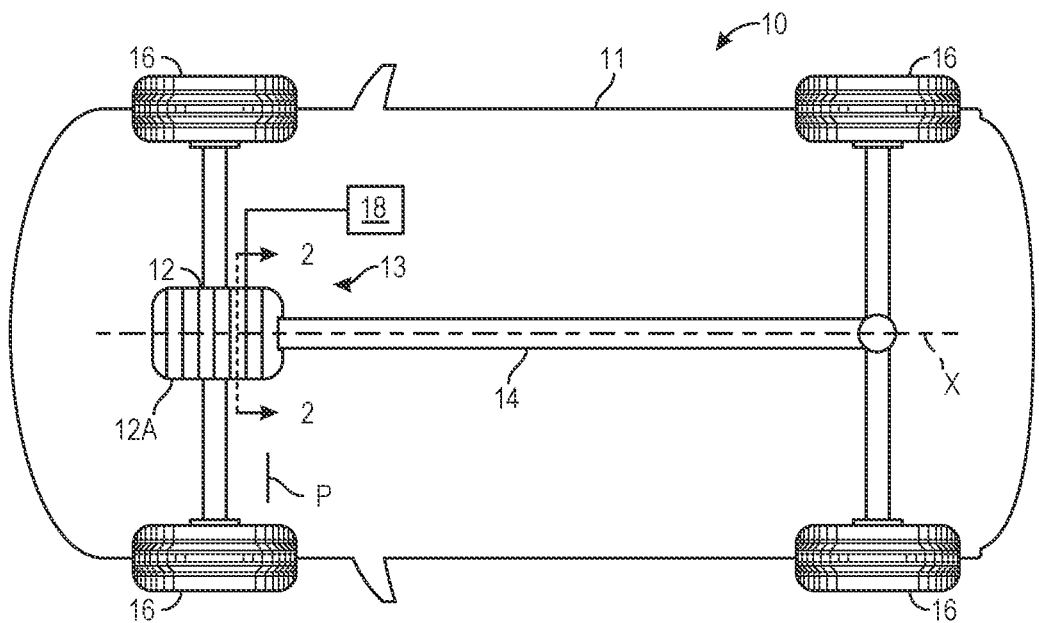
FIG. 1 is a schematic diagram of a vehicle including an electric motor.

Reference will now be made in detail to several examples of the disclosure that are illustrated in accompanying drawings. Whenever possible, the same or similar reference numerals are used in the drawings and the description to refer to the same or like parts or steps.

Referring to the drawings, wherein like reference numbers refer to like components, FIG. 1 shows a vehicle 10 including an electric motor 12 (i.e., an electric motor) configured to propel the vehicle 10. The electric motor 12 can be configured to provide torque or force to another component of the vehicle 10, thereby propelling the vehicle 10. The electric motor 12 is therefore part of a propulsion system 13 of the vehicle 10. Aside from propelling the vehicle 10, the electric motor 12 can be used to power other suitable devices. The electric motor 12 may be a brushless motor and includes six substantially identical interconnected segments 12A disposed side by side along a rotational axis X, which is defined along the length of the electric motor 12. It is contemplated, however, that the electric motor 12 may include more or fewer segments 12A. The number of interconnected segments 12A is directly related to the torque the electric motor 12 is capable of producing for powering the vehicle 10. The vehicle 10 includes a vehicle body 11, and the electric motor 12 is coupled to the vehicle body 11.

The vehicle 10 includes a driveline 14 having a transmission and a driveshaft (not shown). The driveline 14 is operatively connected between the electric motor 12 and the driven wheels 16 via one or more suitable couplers such as constant velocity and universal joints (not shown). The operative connection between electric motor 12 and the driveline 14 allows the electric motor 12 to supply torque to the driven wheels 16 in order to propel the vehicle 10.

The propulsion system 13 also includes a battery (or battery pack) 18 configured to supply electrical energy to the electric motor 12 and other vehicle systems (not shown). To do so, the battery 18 is electrically connected to the electric motor 12. Due to this electrical connection, the electric motor 12 is configured to receive electrical energy from the battery 18 and can operate as a generator when driven by a motive energy source of the vehicle 10 that is external to the electric motor 12. Such external motive energy may be, for example, provided by an internal combustion engine (not shown) or by the driven wheels 16 via vehicle inertia.

Figure 2:
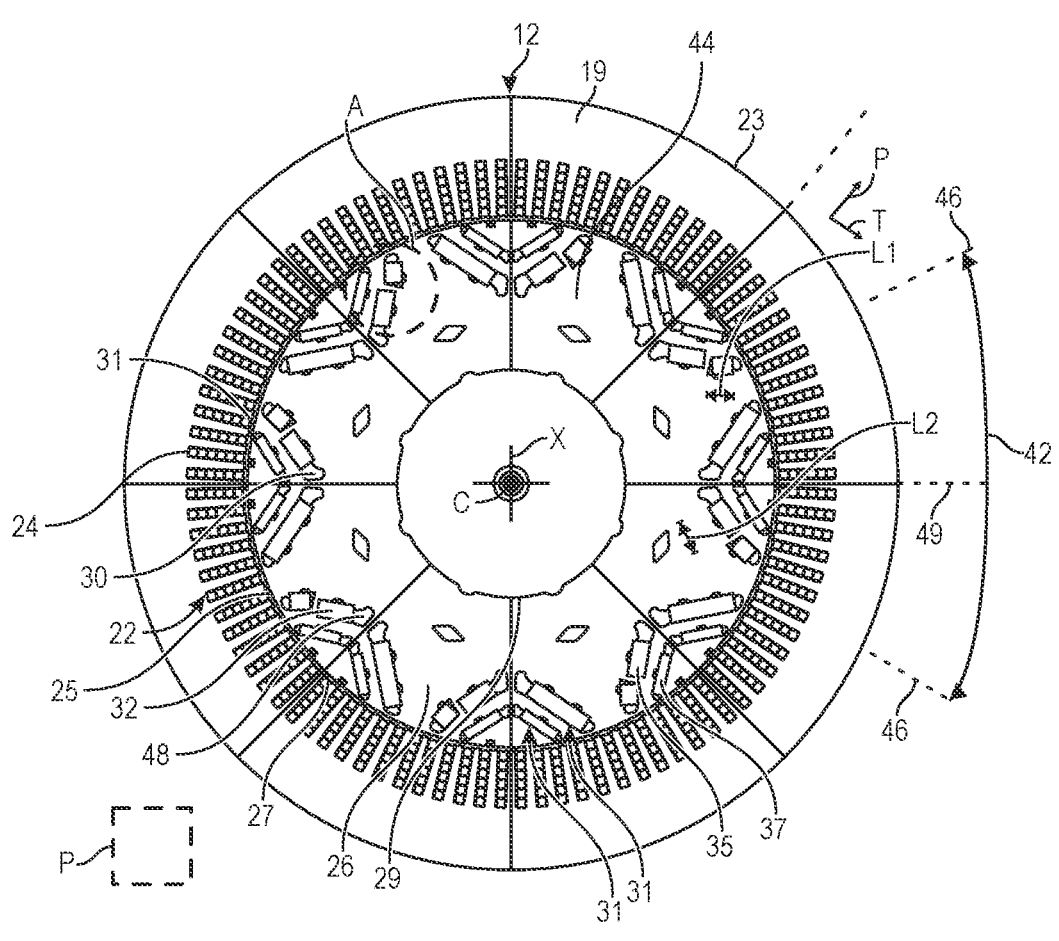
FIG. 2 is a schematic cross-sectional view of the electric motor shown in FIG. 1, taken along section line 2-2 of FIG. 1.

FIG. 2 shows a cross-sectional view of a portion of the electric motor 12 taken along a virtual plane P. The electric motor 12 includes a stator 20 having a stator core 19. The stator core 19 has apertures 22, and the stator 20 includes electrical conductors 24 disposed in the apertures 22. The electrical conductors 24 are electrically connected to the battery 18 (FIG. 1). This electrical connection allows the energy-storage device 18 (FIG. 1) to supply electrical energy to the electrical conductors 24. The stator 20 may have a substantially annular shape and may be disposed around the rotational axis X. Furthermore, the stator 20 may define an outermost stator surface 23 and an innermost stator surface 25 opposite the outermost stator surface 23. Both the outer stator surface 23 and the inner stator surface 25 may define a circumference around the rotational axis X. The apertures 22 may be disposed closer to the inner stator surface 25 than the outer stator surface 23, and each is shaped and sized to receive one or more electrical conductors 24. As used herein, the term "apertures" includes without limitation slits, slots, openings, or any cavity in the stator 20 configured and shaped to receive at least one electrical conductor 24. The electrical conductors 24 may be made of a suitable electrically conductive material such as metallic materials like copper and aluminum. The electrical conductors 24 can be configured as bars or windings and may have any suitable shape such as substantially rectangular, cuboid, and cylindrical shapes. Irrespective of its shape, each electrical conductor 24 is shaped and sized to be received in one aperture 22.

The electric motor 12 further includes a rotor 26 disposed around the rotational axis X and within the stator 20. The stator 20 may be disposed concentrically with the rotor 26. The rotor 26 includes a rotor core 21 wholly or partly formed of a metallic material such as stainless steel, may have a substantially annular shape, and defines a plurality of rotor cavities 30 and a plurality of permanent magnets 32 disposed within the rotor cavities 30. It is envisioned that the rotor cavities 30 may be configured as slots. The permanent magnets 32 are tightly fitted in the rotator cavities 30 and include an alloy of a rare earth element such as neodymium, samarium, or any other suitable ferromagnetic material. Suitable ferromagnetic materials include a Neodymium Iron Boron (NdFeB) alloy and a Samarium Cobalt (SmCo) alloy. The permanent magnets 32 may be annularly around the rotational axis X and are configured to magnetically interact with the electrical conductors 24. During operation of the electric motor 12, the rotor 26 revolves relative to the stator 20 around the rotational axis X in response to the magnetic flux developed between the electrical conductors 24 and the permanent magnets 32, thereby generating drive torque to power the vehicle 10.

The rotor 26 defines an outermost rotor surface 27 and an innermost rotor surface 29 opposite the outermost rotor surface 27. Both the outermost rotor surface 27 and the innermost rotor end 29 may define a circumference around the rotational axis X. The electric motor 12 may define an air gap 31 between the innermost stator surface 25 and the outermost rotor surface 27. The air gap 31 may have a substantially annular shape and spans around the rotor 26. The rotor 26 includes a plurality of poles pieces 42 arranged annularly around a rotor center C, which may coincide with the rotational axis X. Each polar piece 42 represents a magnetic pole of the electric motor 12. Though the drawings show eight polar pieces 42, the rotor 26 may include more or fewer polar pieces 42. Inter-polar bridges 44 separate consecutive polar pieces 42 and can be elongated along respective inter-polar axes 46. Each inter-polar axis 46 extends through the rotator center C and substantially through the middle of a respective inter-polar bridge 44 and defines the demarcation between two consecutive polar pieces 42. Consecutive polar pieces 42 have opposite magnetic polarities. Each polar piece 42 further defines a center pole axis 49 extending through the rotator center C and substantially through the middle of said polar piece 42. The center pole axis 49 of each polar piece 42 may also intersect the rotational axis X.

Each polar piece 42 a plurality of magnetic layers 33. In the depicted embodiment, in each polar piece 42, the plurality of magnetic layers 33 includes a first magnetic layer 35 and a second magnetic layer 37. The second magnetic layer 37 is closer to the outer rotor surface 27 than the first magnetic layer 35. The first magnetic layer 35 is closer to the innermost rotor surface 29 than the second magnetic layer 37. In the depicted embodiment, the first magnetic layer 35 is the closest magnetic layer 33 to the innermost rotor surface 29. As such, no other magnetic layer 33 is closer to the innermost rotor surface 29 than the first magnetic layer 35.

Each magnetic layer 33 includes a plurality of permanent magnets 32, which are disposed in the rotor cavities 30. The rotor cavities 30 are arranged in cavity layers 48, which correspond to the magnetic layers 33. In each polar piece 42, the magnetic layers 33 are spaced apart from one another along a radial direction, which is indicated by arrow R. Although the drawings show two magnetic layers 33, each polar piece 42 may include more or fewer magnetic layers 33. In the depicted embodiment, each magnetic layer 33 only includes two permanent magnets 32 that are spaced apart from each other along a tangential direction, which is indicated by arrow T. In other words, as non-limiting example, each magnetic layer 33 only includes two permanent magnets 32 to maximize the reluctance torque of the electric motor 12 without increasing the spin loss. The tangential direction (as indicated by arrow T) may be perpendicular to the radial direction (indicated by arrow R). Each permanent magnet 32 may be a monolithic structure (i.e., a one-piece structure).

Figure 3:
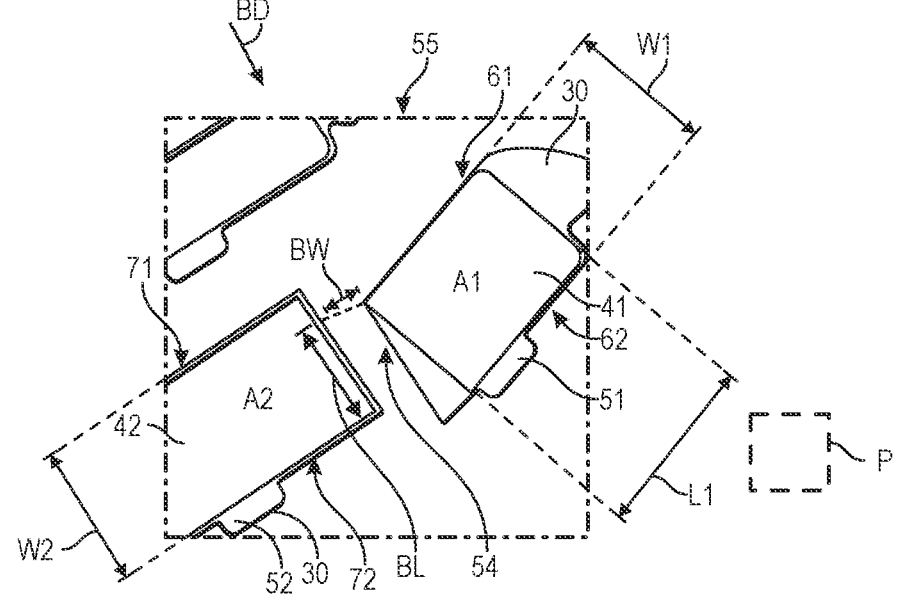
FIG. 3 is a schematic, enlarged cross-sectional view of the electric motor taken around the area A of FIG. 2.

With reference to FIG. 3, the first magnetic layer 35 (which is the innermost magnetic layer) includes the first permanent magnet 41 and the second permanent magnet 42 each disposed in a respective rotor cavity 30 (i.e., the first rotor cavity 51 and the second rotor cavity, respectively). That is, the first permanent magnet 41 is disposed inside the first rotor cavity 51, and the second permanent magnet 42 is disposed inside the second rotor cavity 52. The rotor core 21 includes a single intra-polar bridge 54 in each polar piece 42 to minimize magnetization at light loads. Only the first magnetic layer 35 includes the intra-polar bridge 54. The intra-polar bridge 54 divides the first rotor cavity 51 and the second rotor cavity 52 asymmetrically, thereby defining an asymmetrical rotor design for the permanent magnet leakage path. This asymmetrical rotor design maximizes the torque produced and minimizes the no-flux density in the electric motor 12. Specifically, the asymmetrical rotor design increases the ratio of the maximum torque over the no-flux density of the electric motor 11. Consequently, the efficiency of the electric motor 12 while operating light loads is maximized to minimize energy consumption. At light loads, the magnetic flux from the permanent magnets 32 partially flows through the leakage path. Further, the asymmetrical rotor design minimizes the magnetization of the stator 20. Further, the larger size of the intra-polar bridge 54 enhances the mechanical strength of the rotor 26, thereby allowing greater rotational speed of the rotor 26. At high loads, the stator flux saturates the leakage path. The magnetic flux can be partially recovered to link the stator coils.

The intra-polar bridge 54 generates a leakage path that is saturated by the q-flux (i.e., the torque producing flux) and the negative d flux. As discussed above, the intra-polar bridge 54 is positioned only in one permanent magnet block 55 (which only includes the first permanent magnet 41 and the second permanent magnet 42) to achieve the benefits described above and does not act as a flux barrier with respect to the torque producing flux. In the permanent magnet block 55, the intra-polar bridge 54 is positioned closer to the uttermost rotor surface 27 than the innermost rotor surface 29. As discussed above, the intra-polar bridge 54 is only placed in the first magnetic layer 31 (which is the innermost magnetic layer).

Due to the intra-polar bridge 54, the first permanent magnet 41 and the second permanent magnet 42 have different surface areas along the virtual plane P. The first permanent magnet 41 has a first surface area A1, and the second permanent magnet has 42 a second surface area A2. The second surface area A2 is greater than the first surface area A1 to optimize torque output and the no-flux density of the electric motor 12.

The first permanent magnet 41 has a first length L1 and a first width W1. The second permanent magnet 42 has a second length L2 and a second width W2. The first width W1 is equal to the second width W2. The second length L2 is greater than the second length L2. In the depicted embodiment, the first permanent magnet 41 and the second permanent magnet 42 have rectangular shape. Thus, the first surface area A1 is equal to the first length L1 times the first width W1, and the second surface A1 is equal to the second length L2 times the second width W2. The first width W1 is equal to the second width W2. However, the second length L2 is greater than the first length L2. For example, the second length L2 may be double the first length L1 to define the asymmetrical rotor design described above.

The intra-polar bridge 54 has a bridge width BW that extends from the first rotor cavity 51 to the second rotor cavity 52. The first length L1 of the first permanent magnet 41 is greater than the bridge width BW. The second length L2 of the second permanent magnet 42 is greater than the bridge width BW. For example, the first length L1 is three times greater than the bridge width BW, and the second length L2 is six times greater than the bridge width BW.

The first permanent magnet 41 has a first linear wall 61 and a second linear wall 62 opposite the first linear wall 61. The first width W1 extends from the first linear wall 61 to the second linear wall 62. The first linear wall 61 is closer to the outermost rotor surface 27 than the second linear wall 62. The second linear wall is closer to the innermost rotor surface 29 than the first linear wall 61. The second permanent magnet 42 has a first linear boundary 71 and a second linear boundary 72 opposite the first linear boundary 71. The second width W2 extends from the first linear boundary 71 to the second linear boundary 72. The first linear boundary 71 is closer to the outermost rotor surface 27 than the second linear boundary 72. The second linear boundary 72 is closer to the innermost rotor surface 29 than the first linear boundary 71. The bridge length BL extends the first linear wall 61 of the first permanent magnet 41 to the second linear boundary 72 of the second permanent magnet 42 along a bridge direction BD. The second width W2 of the second permanent magnet 42 is greater than the bridge length BL. For example, the bridge length BL is 0.75 times the second width W2. The first linear boundary 71 is spaced apart from the second linear boundary 72 along the bridge direction BD, and the second width W2 of the second permanent magnet 42 is defined from the first linear boundary 71 to the second linear boundary 72 along the bridge direction BD.

Figure 4:
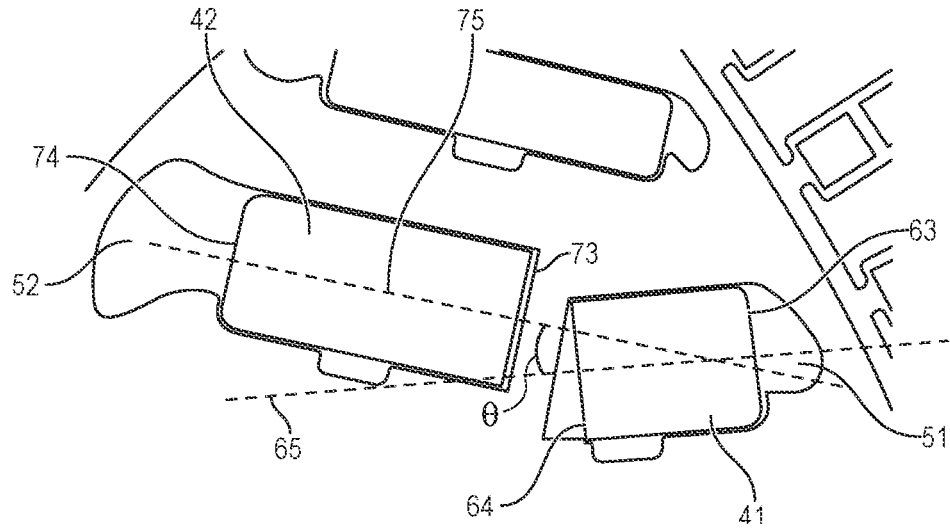
FIG. 4 is a schematic, enlarged view of the electric motor of FIG. 1, showing the asymmetrically angled permanent magnets.

With reference to FIG. 4, the first permanent magnet 41 has a third linear wall 63 and a fourth linear wall 64 opposite the third linear wall 63. The first length L1 of the first permanent magnet 41 extends from the third linear wall 63 to the fourth linear wall 64. The first permanent magnet 41 defines a first axis 65 extending through the third linear wall 63 and the fourth linear wall 64. The first axis 65 is parallel to the first length L1 and intersects the third linear wall 63 at a perpendicular angle. Also, the first axis 65 intersects the fourth linear wall 64 at a perpendicular angle. The second permanent magnet 42 has a third linear boundary 73 and a fourth linear boundary 74. The second length L2 extends from the third linear boundary 73 to the fourth linear boundary 74. The second permanent magnet 42 defines a second axis 75 extending from the third linear boundary 73 to the fourth linear boundary 74. The second axis 75 is parallel to the second length L2 and intersects the third linear boundary 73 at a perpendicular angle. The second axis 75 intersects the fourth linear boundary 74 at a perpendicular angle. An angle θ is defined from the first axis 65 to the second axis 75. The angle θ is oblique to minimize airgap flux density harmonics. The angle θ may be greater than ten degrees and less than ninety degrees. For example, the angle θ may be fifteen degrees.

Figure 5:
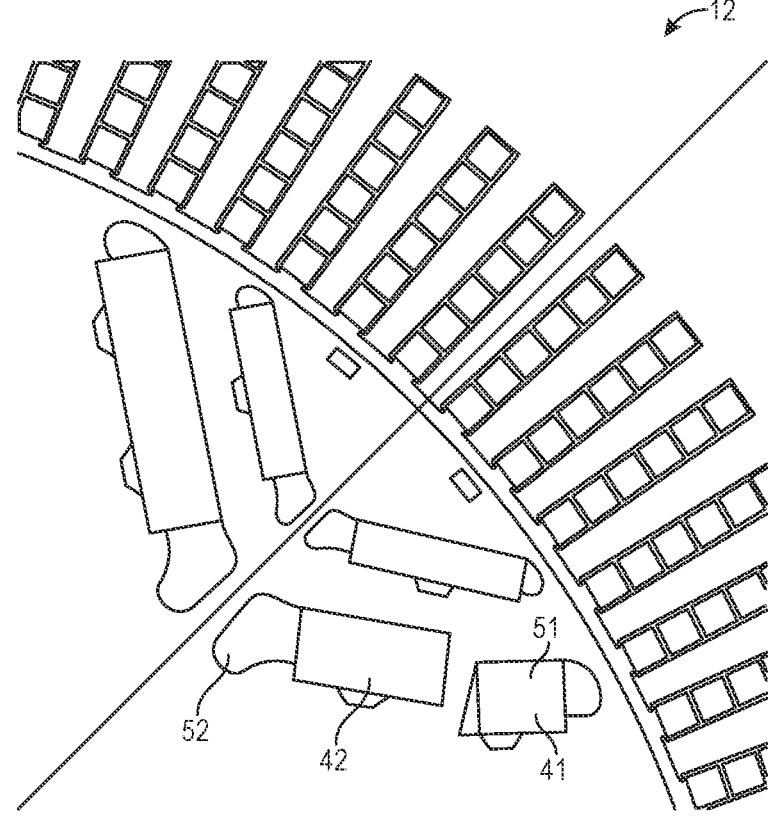
FIG. 5 is a schematic, enlarged view of an electric motor without an intra-polar bridge.

FIG. 5 shows an electric motor 12 substantially similar to the electric motor 12 described above. However, in this embodiment, the electric motor 12 does not include the intra-polar bridge 34 to minimize saturation by increasing the flux path.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An electric motor, comprising:

a stator including a plurality of electrical conductors; and a rotor concentrically disposed in relation to the stator, wherein the rotor is rotatable relative to the stator about a rotational axis, the rotor is spaced apart from the stator to define an air gap between the stator and the rotor, and the rotor includes:

a rotor core defining an outermost rotor surface and an innermost rotor surface opposite the innermost rotor surface, wherein the rotor core includes a plurality of polar pieces arranged annularly about the rotational axis, at least one of the plurality of polar pieces defines a plurality of rotor cavities, and the plurality of rotor cavities includes a first rotor cavity and a second rotor cavity spaced apart from each other; and a plurality of permanent magnets each disposed in one of the plurality of rotor cavities, the plurality of permanent magnets includes a first permanent magnet and a second permanent magnet, the first permanent magnet is disposed inside the first rotor cavity, and the second permanent magnet is disposed in the second rotor cavity;

wherein the rotor core includes an intra-polar bridge in each of the each of the plurality of polar pieces, the intra-polar bridge separates the first rotor cavity from the second rotor cavity, the first permanent magnet has a first surface area, the second permanent magnet has a second surface area, and the second surface area is greater than the first surface area, wherein the first permanent magnet has a first length and a first width, the second permanent magnet has a second length and a second width, the first width is equal to the second width, and the second length is greater than the second length, and wherein the intra-polar bridge has a bridge width that extends from the first rotor cavity to the second rotor cavity, the first length of the first permanent magnet is greater than the bridge width, and the second length of the second permanent magnet is greater than the bridge width.

2. The electric motor of claim 1, wherein the first permanent magnet and the second permanent magnet each have a rectangular shape.

3. The electric motor of claim 1, wherein the intra-polar bridge is positioned closer to the outermost rotor surface than the innermost rotor surface.

4. The electric motor of claim 1, wherein the intra-polar bridge has a bridge length, the first permanent magnet has a first linear wall and a second linear wall opposite the first linear wall, the first width extends from the first linear wall to the second linear wall, the first linear wall is closer to the outermost rotor surface than the second linear wall, the second linear wall is closer to the innermost rotor surface than the first linear wall, the second permanent magnet has a first linear boundary and a second linear boundary opposite the first linear boundary, the second width extends from the first linear boundary to the second linear boundary, the first linear boundary is closer to the outermost rotor surface than the second linear boundary, the second linear boundary is closer to the innermost rotor surface than the first linear boundary, the bridge length extends the first linear wall of the first permanent magnet to the second linear boundary of the second permanent magnet along a bridge direction, and the second width of the second permanent magnet is greater than the bridge length.

5. The electric motor of claim 4, wherein the first linear boundary is spaced apart from the second linear boundary along the bridge direction, the second width of the second permanent magnet is defined from the first linear boundary to the second linear boundary along the bridge direction, and the bridge length is 0.75 times the second width.

6. The electric motor of claim 5, wherein the bridge length is less than the first width of the first permanent magnet.

7. The electric motor of claim 5, wherein the first permanent magnet has a third linear wall and a fourth linear wall, the first length of the first permanent magnet extends from the third linear wall to the fourth linear wall, the first permanent magnet defines a first axis extending through the third linear wall and the fourth linear wall, the first axis intersects the third linear wall at a perpendicular angle, the first axis intersects the fourth linear wall at a perpendicular angle, the second permanent magnet has a third linear boundary and a fourth linear boundary, the second length extends from the third linear boundary to the fourth linear boundary, the second permanent magnet defines a second axis extending from the third linear boundary to the fourth linear boundary, the second axis intersects the third linear boundary at a perpendicular angle, the second axis intersects the fourth linear boundary at a perpendicular angle, an angle is defined from the first axis to the second axis, the angle is oblique, and the angle is greater than ten degrees, the angle is less than ninety degrees.

8. A propulsion system for a vehicle, comprising:
a battery;
an electric motor electrically connected to the battery, wherein the electric motor includes:
a stator including a plurality of electrical conductors; and
a rotor concentrically disposed in relation to the stator, wherein the rotor is rotatable relative to the stator about a rotational axis, the rotor is spaced apart from the stator to define an air gap between the stator and the rotor, and the rotor includes:
a rotor core defining an outermost rotor surface and an innermost rotor surface opposite the innermost rotor surface, wherein the rotor core includes a plurality of polar pieces arranged annularly about the rotational axis, at least one of the plurality of polar pieces defines a plurality of rotor cavities, and the plurality of rotor cavities includes a first rotor cavity and a second rotor cavity spaced apart from each other; and
a plurality of permanent magnets each disposed in one of the plurality of rotor cavities, the plurality of permanent magnets includes a first permanent magnet and a second permanent magnet, the first permanent magnet is disposed inside the first rotor cavity, and the second permanent magnet is disposed in the second rotor cavity;

wherein the rotor core includes an intra-polar bridge in each of the each of the plurality of polar pieces, and the first permanent magnet has a first surface area, the second permanent magnet has a second surface area, and the second surface area is greater than the first surface area, wherein the first permanent magnet has a first length and a first width, the second permanent magnet has a second length and a second width, the first width is equal to the second width, and the second length is greater than the second length, and wherein the intra-polar bridge has a bridge width that extends from the first rotor cavity to the second rotor cavity, the first length of the first permanent magnet is greater than the bridge width, and the second length of the second permanent magnet is greater than the bridge width, and the second length is double the first length.

9. The propulsion system of claim 8, wherein the first permanent magnet and the second permanent magnet each have a rectangular shape.

10. The propulsion system of claim 8, wherein the intra-polar bridge is positioned closer to the outermost rotor surface than the innermost rotor surface.

11. The propulsion system of claim 8, wherein the intra-polar bridge has a bridge length, the first permanent magnet has a first linear wall and a second linear wall opposite the first linear wall, the first width extends from the first linear wall to the second linear wall, the first linear wall is closer to the outermost rotor surface than the second linear wall, the second linear wall is closer to the innermost rotor surface than the first linear wall, the second permanent magnet has a first linear boundary and a second linear boundary opposite the first linear boundary, the second width extends from the first linear boundary to the second linear boundary, the first linear boundary is closer to the outermost rotor surface than the second linear boundary, the second linear boundary is closer to the innermost rotor surface than the first linear boundary, the bridge length extends the first linear wall of the first permanent magnet to the second linear boundary of the second permanent magnet along a bridge direction, and the second width of the second permanent magnet is greater than the bridge length.

12. The propulsion system of claim 11, wherein the first linear boundary is spaced apart from the second linear boundary along the bridge direction, the second width of the second permanent magnet is defined from the first linear boundary to the second linear boundary along the bridge direction, and the first length is three times greater than the bridge width.

13. The propulsion system of claim 12, wherein the bridge length is less than the first width of the first permanent magnet.

14. The propulsion system of claim 13, wherein the first permanent magnet has a third linear wall and a fourth linear wall, the first length of the first permanent magnet extends from the third linear wall to the fourth linear wall, the first permanent magnet defines a first axis extending through the third linear wall and the fourth linear wall, the first axis intersects the third linear wall at a perpendicular angle, the first axis intersects the fourth linear wall at a perpendicular angle, the second permanent magnet has a third linear boundary and a fourth linear boundary, the second length extends from the third linear boundary to the fourth linear boundary, the second permanent magnet defines a second axis extending from the third linear boundary to the fourth linear boundary, the second axis intersects the third linear boundary at a perpendicular angle, the second axis intersects the fourth linear boundary at a perpendicular angle, an angle is defined from the first axis to the second axis, the angle is oblique, and the angle is fifteen degrees, the second surface area is double the first surface area.

15. A vehicle, comprising:

a vehicle body;

an electric motor coupled to the vehicle body, wherein the electric motor includes:

a stator including a plurality of electrical conductors; and a rotor concentrically disposed in relation to the stator, wherein the rotor is rotatable relative to the stator about a rotational axis, the rotor is spaced apart from the stator to define an air gap between the stator and the rotor, and the rotor includes:

a rotor core defining an outermost rotor surface and an innermost rotor surface opposite the innermost rotor surface, wherein the rotor core includes a plurality of polar pieces arranged annularly about the rotational axis, at least one of the plurality of polar pieces defines a plurality of rotor cavities, and the plurality of rotor cavities includes a first rotor cavity and a second rotor cavity spaced apart from each other; and a plurality of permanent magnets each disposed in one of the plurality of rotor cavities, the plurality of permanent magnets includes a first permanent magnet and a second permanent magnet, the first permanent magnet is disposed inside the first rotor cavity, and the second permanent magnet is disposed in the second rotor cavity;

wherein the rotor core includes an intra-polar bridge in each of the each of the plurality of polar pieces, the intra-polar bridge separates the first rotor cavity from the second rotor cavity, the first permanent magnet has a first surface area, the second permanent magnet has a second surface area, and the second surface area is greater than the first surface area, wherein the first permanent magnet has a first length and a first width, the second permanent magnet has a second length and a second width, the first width is equal to the second width, and the second length is greater than the second length, and wherein the intra-polar bridge has a bridge width that extends from the first rotor cavity to the second rotor cavity, the first length of the first permanent magnet is greater than the bridge width, and the second length of the second permanent magnet is greater than the bridge width.

16. The vehicle of claim 15, wherein the first permanent magnet and the second permanent magnet each have a rectangular shape.

17. The vehicle of claim 15, wherein the intra-polar bridge is positioned closer to the outermost rotor surface than the innermost rotor surface.

18. The vehicle of claim 15, wherein the intra-polar bridge has a bridge length, the first permanent magnet has a first linear wall and a second linear wall opposite the first linear wall, the first width extends from the first linear wall to the second linear wall, the first linear wall is closer to the outermost rotor surface than the second linear wall, the second linear wall is closer to the innermost rotor surface than the first linear wall, the second permanent magnet has a first linear boundary and a second linear boundary opposite the first linear boundary, the second width extends from the first linear boundary to the second linear boundary, the first linear boundary is closer to the outermost rotor surface than the second linear boundary, the second linear boundary is closer to the innermost rotor surface than the first linear boundary, the bridge length extends the first linear wall of the first permanent magnet to the second linear boundary of the second permanent magnet along a bridge direction, and the second width of the second permanent magnet is greater than the bridge length.

19. The vehicle of claim 18, wherein the first linear boundary is spaced apart from the second linear boundary along the bridge direction, the second width of the second permanent magnet is defined from the first linear boundary to the second linear boundary along the bridge direction, and the second length is six times greater than the bridge width.

20. The vehicle of claim 19, wherein the bridge length is less than the first width of the first permanent magnet.

* * * * *